Jan. 31, 1933. C. S. JOHNSON 1,895,626
MATERIAL HANDLING APPARATUS
Filed April 29, 1931 2 Sheets-Sheet 1
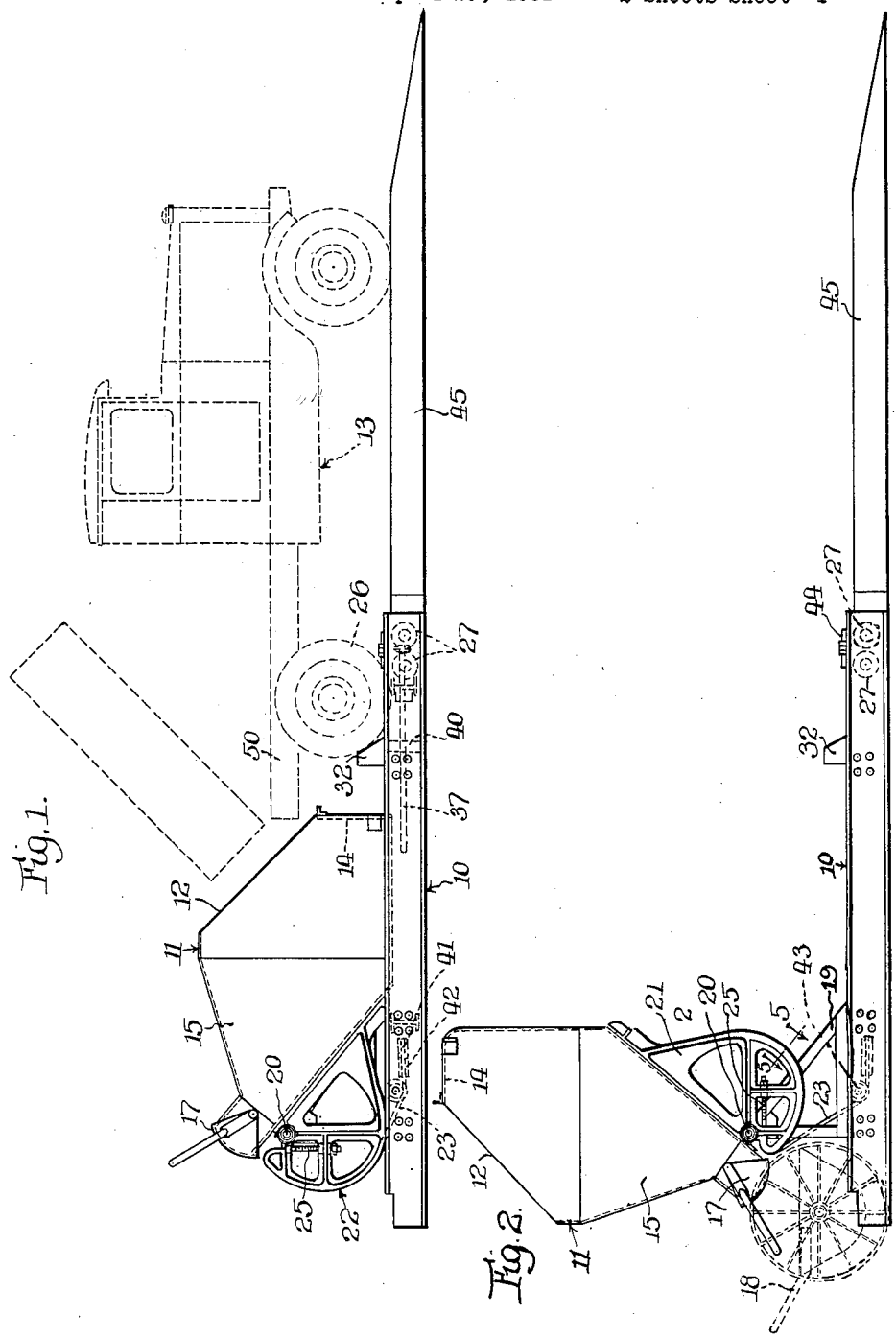

Jan. 31, 1933.  C. S. JOHNSON  1,895,626
MATERIAL HANDLING APPARATUS
Filed April 29, 1931   2 Sheets-Sheet 2
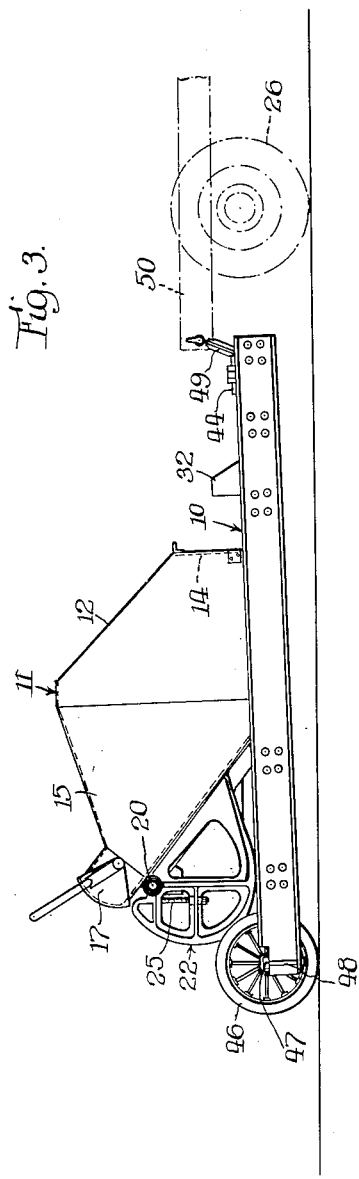
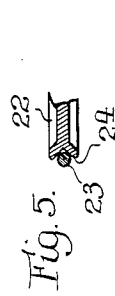
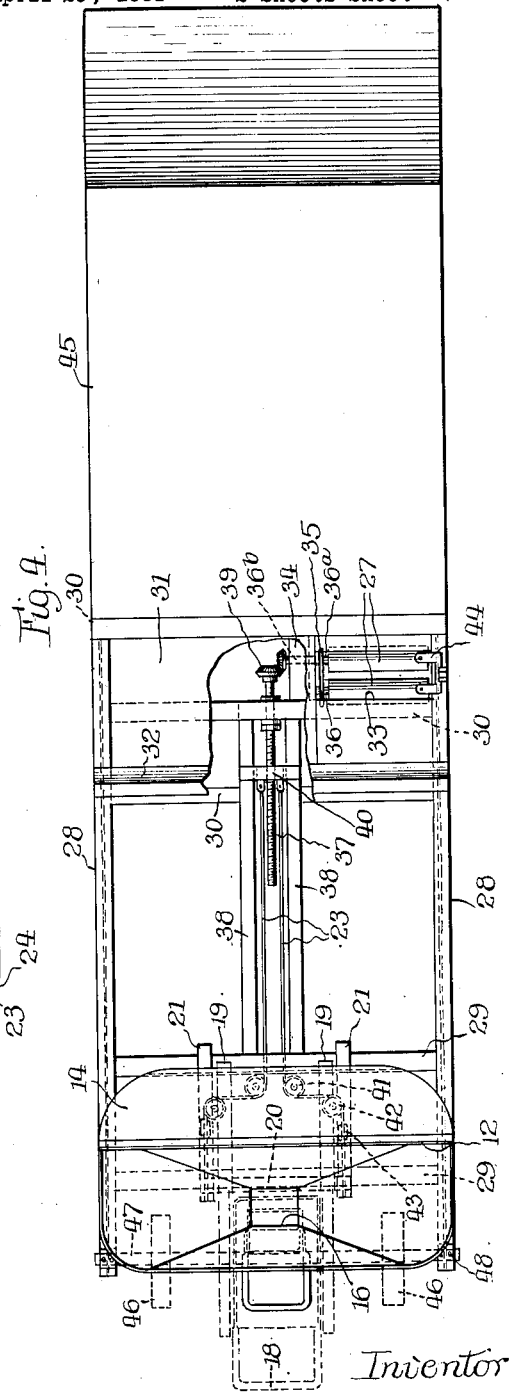
Inventor:
C. S. Johnson,
By Churdahl Parker Carlson
Attys.

Patented Jan. 31, 1933

1,895,626

UNITED STATES PATENT OFFICE

CHARLES S. JOHNSON, OF CHAMPAIGN, ILLINOIS

MATERIAL HANDLING APPARATUS

Application filed April 22, 1931. Serial No. 533,665.

The invention relates generally to material handling apparatus and more particularly to apparatus embodying a hopper adapted to contain a supply of material such as plastic concrete or aggregate and to discharge its contents under manual control.

When material such as aggregate or ready-mixed concrete is delivered to a customer, the common practice on small jobs is to discharge it from the truck onto the ground or a suitable dump board, from which it is moved manually, as by shovelling, to the place where it is to be used. In some cases it is shovelled into carts or wheel barrows for transportation, but in any case the manual labor and the time required are objectionable.

The primary object of the present invention is, therefore, to provide new and improved apparatus for eliminating these objectionable and time-consuming manual operations, which apparatus shall be simple in character, adapted to receive the contents of a material truck as it is dumped, and operable to discharge the material quickly and easily into suitable conveying vehicles.

Another object is to provide such apparatus embodying a hopper mounted for movement between two positions, in one of which it is adapted to receive material as it is dumped from a truck, and in the other of which it supports the material for gravity discharge from the hopper at a suitable elevation above the ground.

Another object is to produce such apparatus arranged to permit the truck to be dumped without elevating the truck as a whole to any appreciable extent above the ground level, and still capable of discharging the material efficiently into conveying vehicles.

A still further object is to provide such apparatus embodying a shiftable hopper designed to produce a comparatively small over-all height in the apparatus whereby to simplify its storage and transportation.

Among the other objects of the invention are the production of an apparatus embodying a shiftable hopper with simple and effective means for moving the hopper, means for utilizing power from a truck to actuate the hopper, and the provision of an apparatus adapted for ready transportation.

Other objects and advantages will become apparent from the following description taken in connection with the accompanying drawings, in which:

Figure 1 is a side elevational view of one form of material-handling apparatus embodying the features of the invention, the hopper being shown in its loading position.

Fig. 2 is a view of the apparatus shown in Fig. 1 with the hopper in its elevated discharge position.

Fig. 3 is a side elevational view showing the apparatus as it is adapted for transportation.

Fig. 4 is a plan view of the apparatus showing the parts in the position occupied in Fig. 2, certain parts of the base being broken away to illustrate the interior construction thereof.

Fig. 5 is a fragmental sectional view taken along the line 5—5 of Fig. 2.

While the invention is susceptible of various modifications and alternative constructions, I have shown in the drawings and will herein describe in detail the preferred embodiment, it being understood that I do not thereby intend to limit the invention to the specific form disclosed, but intend to cover all modifications and alternative constructions falling within the spirit and scope of the invention as expressed in the appended claims.

In the form illustrated herein the invention is embodied in an apparatus having an elongated rectangular platform or base 10 adapted to rest upon the ground and having an elongated hopper 11 shiftably supported upon the base for movement from a lowered loading position shown in Fig. 1 to an elevated discharge position shown in Fig. 2.

In the loading position the hopper 11 is located so as to extend longitudinally along the base 10 with its longitudinal axis substantially horizontal, and in one end (the right end as shown in Fig. 1) the hopper has a comparatively large charging opening 12 which, when the hopper is in its loading position, is located comparatively close to the upper surface of the base and faces upwardly so that the contents of a truck 13 may be dumped into the hopper. As shown in Fig. 4, the end of the hopper in which the charging opening 12 is formed is quite wide and the charging opening 12 is of sufficient width to insure that all of the contents of the truck will fall into the hopper. It will be seen that the material dumped from the truck will be retained in the hopper while in its loading position by an end wall 14 which extends upwardly (Fig. 1) and defines one edge of the charging opening 12.

At its other end the hopper 11 has a tapered section 15 which at its smaller end defines a restricted discharge opening 16 (Fig. 4) which is preferably positioned so as to be elevated a considerable distance above the base 10 when the hopper 11 is in its horizontal loading position.

When the hopper 11 is shifted to its discharge position (Fig. 2) the parts thereof are all located above the discharge opening 16 and the contents of the hopper tends by gravity to flow toward and out of the discharge opening. To control such discharge a gate or valve 17 is pivoted to the hopper 11 so as to be manually movable across the discharge opening 16 to close the same. In its discharge position the hopper 11 is located so that its discharge opening 16 is elevated a considerable distance above the ground and it discharges beyond one end of the base 10 so that, as shown in Fig. 2, a cart 18 resting on the ground may be positioned so as to receive material from the hopper 11 under the control of the valve 17.

The present invention has for one of its objects the provision of apparatus having a small overall height so as to facilitate transportation and storage thereof, and to this end the mounting and shifting means for the hopper 11 is preferably of such a character that it is located entirely below the highest point of the hopper when the hopper is in its lower or loading position. Accordingly the supporting means shown herein is pivotal in its character and is located upon two triangularly shaped standards 19 mounted on the upper surface of the base 10 near one end thereof and in laterally spaced relation as shown in Fig. 4 of the drawings. Extending across and beyond the upper ends of the standards 19 and rotatably journaled thereon is a shaft 20 which is connected to the lower side of the converging section 15 of the hopper adjacent to the discharge opening 16. The connection between the shaft 20 and the hopper 11 is formed by two brackets 21 engaging the ends of the shaft 20 which project beyond the standards 19 (Fig. 4) and extend along and engage the lower converging surfaces of the hopper so as to strengthen the same.

The brackets 20 in the present case constitute a part of the means for raising the hopper from its receiving position to its discharge position. This means is preferably arranged to act with a comparatively large power multiplication when the hopper is in its loading position, and to reduce the size of the raising means it is arranged to act with a decreasing power multiplication as the hopper reaches its discharge position. With this end in view each bracket 21 is provided with a generally arcuate segment 22 which is eccentrically positioned with relation to the shaft 20 and projects downwardly from the shaft when the hopper 11 is in its loading position. Thus the projection of the segments 22 endwise of the hopper (that is to the left in Fig. 1) is maintained at a minimum. Cooperating with each segment 21 is a flexible member in the form of a cable 23 extending about the segment in an outwardly facing groove 24 as shown in Fig. 5. One end of each cable is secured to its segment 22 by means of a bolt 25 (Fig. 1) and from their fastened ends the cables extend downwardly about the segments 22 and rearwardly therefrom.

To tighten or draw the cables 23 rearwardly and thus elevate the hopper 11, means is preferably provided which is mounted permanently on the base 10. This means is preferably of such a character that it may be actuated by the rear wheels 26 of a truck 13 and to this end it includes a pair of rollers 27 rotatably mounted on closely spaced horizontal axes adjacent to one side of the base 10 and beyond the charging end of the hopper when it is in its loading position. To provide a comparatively light structure and a suitable mounting for the rollers 27 and the other parts of the actuating mechanism, the base 10 is of skeleton form having elongated side frame members 28 connected at suitably spaced intervals by the transverse members 29 and 30. The three transverse members 30 adjacent to the end in which the rollers 27 are mounted are covered by a floor 31 upon which the truck wheels 26 may run rearwardly into contact with a stop 32 to determine the dumping position of the truck. Just beyond the dumping position of the wheels 26 and toward the adjacent end of the base 10 the floor 31 has an opening 33 formed therein beneath which the rollers 27 are mounted, the rollers being supported in the adjacent side frame member 28 and in a longitudinally extending member 34 connecting two of the transverse frame members 30. The rollers 27 are connected to rotate in unison by means of a belt 35 running over sheaves fixed to the shafts 36 and 36$^a$ of the pulleys. The belt also engages a sheave on a parallel shaft 36$^b$ which is operatively connected to the cables 23 to transmit movement thereto.

The power-transmitting connection between the shaft 36$^b$ and the cables 23 preferably embodies screw means which provides the desired speed reduction and serves automatically to hold the hopper 11 in any desired position. Accordingly a screw shaft 37 is journaled rotatably but non-translatably in one of the transverse members 30 of the base between spaced guides 38 which are connected to two parallel transverse members 29 and 30. One end of the shaft 37 is drivingly connected to the shaft 36ᵇ by beveled gears 39 fixed on the two shafts. On the threaded portion of the shaft is a nut 40 mounted so as to be moved longitudinally between the guides 38 by rotation of the screw shaft 37.

The two cables 23 are connected to the nut 40 on opposite sides of the screw shaft 37, suitable guide means being provided for the cables to change the direction thereof and maintain them in proper alinement with the two segments 22. This guide means in the present case comprises a pair of guide rollers 41 mounted in the base adjacent to one of the transverse members 29 for rotation about vertical axes. About the two guide rollers 41 the two cables 23 extend laterally toward the outer side edges of the base 10 into engagement with a similar pair of guide rollers 42 about which the cables extend parallel to the longitudinal axis of the base 10 and toward the segments 22. Between the two guide rollers 42 and the segments 22, the two cables 23 engage the lower peripheral surfaces of guide rollers 43 rotatably mounted in the base 10 for rotation about horizontal axes.

After the truck has been dumped it is driven ahead from the position shown in Fig. 1 onto the rollers 27 so that they are rotated by the right-hand rear wheel 26 of the truck, and such rotation is transmitted to the screw device and thence to the cables 23 so as to elevate the hopper 11. During the first part of the hopper-elevating movement the power is transmitted through a comparatively long lever arm in the segments 22, and as the hopper approaches its discharge position this lever arm gradually decreases. In case the rotation of the truck wheels 26 is not stopped immediately upon completion of the elevating movement of the hopper, the frictional connection provided by the belt 35 will permit continued rotation of the rollers 27 without causing undue strain on the parts of the device.

The truck 27 may then be driven off the platform and to enable this to be done, a locking device 44 is provided in the form of a pair of pivoted levers mounted on the frame member 28 adjacent to the rollers 27 and adapted to engage suitable recesses (not shown) in the rollers so as to prevent rotation thereof. To refill the hopper 11, it is lowered to its charging position by the incoming loaded truck 13, which is stopped with one rear wheel 26 resting on the rollers 27. The locking device 44 is disengaged from the rollers and the wheel 26 driven in the proper direction until the hopper has been lowered to the position shown in Fig. 1. The locking device 44 is then engaged with the rollers and the truck 13 is backed to its dumping position as determined by the stop 32. After dumping, the truck is advanced into engagement with the rollers 27 and the hopper is elevated as above described.

As shown herein a separately formed ramp 45 is provided which may be placed adjacent to the end of the base 10 so that the truck will be located in horizontal position when it is dumped.

The present embodiment of the invention is adapted to be readily transported and to this end a pair of wheels 46 (Figs. 3 and 4) are provided having an axle 47 adapted to be secured to one end of the base 10. In Fig. 4, the two wheels 46 are shown in dotted outline. In the present case the side frame members 28 project beyond the standards 19 upon which the hopper is mounted so that the axle 47 may be connected by means of bolts 48 to these projecting ends with the wheels 46 located between the two side members of the frame. Thus wheels of standard gauge may be used. By providing a suitable swivel connector 49 at the other end of the base 10 the apparatus may be connected to the frame 50 of the truck 13 so as to form a trailer adapted to be transported behind a truck.

From the foregoing description it will be apparent that the invention provides apparatus whereby the contents of a truck may be quickly and easily transferred from the truck into a plurality of small conveying vehicles, and it will be clear that the material may be retained in the hopper after the truck has departed and that the contents may be discharged by the workmen under manual control. It will also be clear that the apparatus is compact and rugged in character so as to be easily transported and stored, and that it provides simple and effective means for utilizing the power of a truck for elevating the hopper to its discharge position.

I claim as my invention:

1. A device of the character described comprising a base, laterally spaced supports upstanding from one end of said base, a horizontal shaft journaled in and extending between said supports with its ends projecting beyond the supports, an elongated hopper having a restricted discharge opening at one end thereof, means supporting said hopper on said shaft adjacent to said discharge opening so that said hopper may extend from said shaft along said base toward the other end thereof, a pair of generally arcuate segments connected to said hopper adjacent to the projecting ends of said shaft and eccentrically related to said shaft so as to extend downwardly from the shaft when said hopper is in its substantially horizontal position, a pair of flexible members connected to said segments and extending downwardly about the same and then rearwardly, and means on said base for drawing said flexible members rearwardly to rotate said hopper about the axis of said shaft and thereby elevate said hopper.

2. A device of the character described comprising a base, an elongated hopper having a discharge opening at one end thereof and a charging opening at the other end, means pivotally supporting said hopper on said base adjacent to its discharge opening for pivotal movement about an elevated horizontal axis, a pair of generally arcuate segments connected to said hopper and eccentrically positioned with respect to said axis arranged to extend downwardly from the hopper when said hopper is in a substantially horizontal position, a pair of flexible elements connected to and extending around said segments and then downwardly therefrom, and means on said base for exerting traction on said elements so as to rotate said hopper from its horizontal position to an elevated discharge position.

3. Material handling apparatus comprising a hopper having a discharge opening at one end and a charging opening at the other end, means pivotally mounting said hopper for movement about an elevated horizontal axis located adjacent to said discharge opening, and means mounted beneath said hopper and acting with a gradually decreasing power multiplication to tilt said hopper upwardly about said axis.

4. A device of the character described comprising a base, a hopper having a discharge opening at one end and a charging opening at the other end thereof, means supporting said hopper on said base for shifting movement from a loading position in which said charging opening is closely adjacent to said base to a discharge position in which the discharge opening is located below the other parts of the hopper, flexible means connected to said hopper for shifting the same between said positions, and a screw device mounted in said base and connected to said flexible means for applying power thereto.

5. A device of the character described comprising a base, a hopper having a discharge opening at one end and a charging opening at the other end thereof, means supporting said hopper on said base for shifting movement from a loading position in which said charging opening is closely adjacent to said base to a discharge position in which the discharge opening is located below the other parts of the hopper, means providing a drum-like surface connected to said hopper, flexible members connected to said means and extending about said surface, and screw means for exerting traction on said flexible members to shift said hopper.

6. A device of the character described comprising, in combination, a flat base adapted to rest on the ground, an elongated hopper having a discharge opening at one end and a charging opening at the other end thereof, means supporting said hopper pivotally adjacent to its discharge end for movement about an elevated horizontal axis, means connected to said hopper, providing drum-like surfaces about said axis, flexible members connected to said means and extending downwardly about said surfaces, and screw means extending longitudinally of said hopper and connected to said flexible members for exerting traction on the same to raise the hopper.

7. Material handling apparatus comprising, in combination, an elongated base, a hopper having a restricted discharge opening at one end and a charging opening at the other end, means pivotally supporting said hopper on said base for movement about an elevated horizontal axis, a pair of generally arcuate segments connected to said hopper and spaced longitudinally of said axis, said segments being mounted eccentrically with respect to said axis so as to extend downwardly therefrom when the hopper is in a substantially horizontal position, a pair of flexible members connected to and extending downwardly around said segments and then rearwardly therefrom, guide rollers mounted in said base, said flexible elements extending about said rollers and toward the central portion of said base, a pair of guide rollers near the central portion of the base about which said elements extend longitudinally of the base in closely spaced relation to each other, a screw mounted in and extending longitudinally of said base, a cross head mounted on said screw for longitudinal movement thereby, means connecting said flexible elements to said cross head, and means for actuating said screw.

8. A device of the character described comprising, in combination, a flat base adapted to rest on the ground, an elongated hopper having a discharge opening at one end and a charging opening at the other end thereof, means supporting said hopper pivotally adjacent to its discharge end for movement about an elevated horizontal axis, means connected to said hopper providing drum-like surfaces about said axis, flexible members connected to said means and extending downwardly about said surfaces, a pair of rollers mounted in said base at the other end thereof and adapted to be driven by a truck wheel resting thereon, and means operatively connecting one of said rollers to said flexible members for tightening the same.

9. A device of the character described comprising, in combination, a flat base adapted to rest on the ground, an elongated hopper having a discharge opening at one end and a charging opening at the other end thereof, means supporting said hopper pivotally adjacent to its discharge end for movement about an elevated horizontal axis, a pair of rollers mounted in said base adjacent to the other end thereof and adapted to be driven by a truck wheel resting thereon, and means connecting one of said rollers to said hopper operable by rotation of said rollers to pivot said hopper to an elevated discharge position.

10. A device of the character described comprising a platform, a hopper tiltably mounted on the platform for movement about a horizontal axis elevated above the platform, means on the platform adapted to be actuated by a truck wheel and operable to tilt the hopper, means at one end of the platform for attaching the platform to a truck, and a pair of wheels detachably connected to the other end of said platform to movably support the same.

11. A device of the character described comprising a platform, a hopper shiftably mounted on the platform for movement from a lowered loading position to an elevated discharge position above the platform, means on the platform operable to shift the hopper, means at one end of the platform for attaching the platform to a truck, and a pair of wheels detachably connected to the other end of said platform to movably support the same.

12. A device of the character described comprising a hopper mounted for turning movement from a low charging position to an elevated discharging position, a roller adapted to be driven by a drive wheel of a motor truck resting thereon, a support for the other drive wheel, and means operatively connecting said roller to said hopper for turning the latter, said means including an element movable to turn the hopper, a screw rotatable to actuate said element, and a frictional operating connection between said roller and said screw.

13. A device of the character described comprising, in combination, a base adapted to rest upon the ground, one end of the base being adapted to support the rear wheels of a motor truck, a hopper mounted upon the other end of the base for turning movement from a low charging position to an elevated discharging position, a stop on the base for engagement by such rear wheels to determine the dumping position of the truck, in which position the truck overhangs the hopper, and means located on the base and arranged to be driven by a rear wheel of a truck resting on said base when the truck is out of such overhanging position for turning the hopper.

14. A device of the character described comprising a base, a hopper mounted on the base, for turning movement from a low charging position to an elevated discharging position, a roller on the base adapted to be driven by a drive wheel of a motor truck resting thereon, a support on the base for the other drive wheel, means connecting said roller to said hopper for turning the latter, and a stop on the base intermediate the hopper and the roller to determine the dumping position of the truck with respect to the hopper.

15. A device of the character described comprising a base, a hopper mounted on one end of the base for turning movement from a low charging position to an elevated discharging position, means on the other end of the base adapted to be driven by a motor truck resting on the base for turning the hopper, and a stop on the base intermediate the hopper and said driven means for engagement by the rear wheels of the truck to determine the dumping position of the latter with respect to the hopper.

In testimony whereof, I have hereunto affixed my signature.

CHARLES S. JOHNSON.